United States Patent [19]

Carroll

[11] Patent Number: 4,776,102
[45] Date of Patent: Oct. 11, 1988

[54] TOOL FOR MEASURING THE HEIGHT OF A MATERIAL BUILDUP ON A REFERENCE PLANE

[75] Inventor: Thomas A. Carroll, Manhattan Beach, Calif.

[73] Assignee: Hughes Aircraft Company, Los Angeles, Calif.

[21] Appl. No.: 85,505

[22] Filed: Aug. 14, 1987

[51] Int. Cl.[4] .............................................. G01B 3/28
[52] U.S. Cl. ....................................... 33/557; 33/558; 33/169 B; 33/172 E
[58] Field of Search ............. 33/169 B, 169 R, 172 E, 33/561, 558, 557

[56] References Cited

U.S. PATENT DOCUMENTS

| | | | |
|---|---|---|---|
| 1,894,025 | 1/1933 | Dennison et al. | 33/172 E |
| 2,512,879 | 6/1950 | Roggenstein | 33/169 B X |
| 2,913,829 | 11/1959 | Arlin | 33/172 E X |
| 3,253,338 | 5/1966 | Burnette | 33/169 |
| 3,903,609 | 9/1975 | Brown | 33/169 B |
| 4,227,308 | 10/1980 | Talansky et al. | 33/169 B |

Primary Examiner—William D. Martin, Jr.
Attorney, Agent, or Firm—Ronald L. Taylor; V. G. Laslo; A. W. Karambelas

[57] ABSTRACT

A tool (10) is used for detecting whether material (14) on a reference surface (12) has exceeded a predetermined height. The tool (10) includes a housing (32) having a bottom surface with at least one opening (34) therein for receiving the material (14) whose height is to be tested. A probe means (44) is slideably mounted within the housing (32) and has one end located in the opening (34) for contacting the material (14). A circuit (18, 22) includes a pair of contacts (30) spaced a given distance from a predetermined portion of the probe (44). An indicator (66) is coupled to the circuit for signaling that the height of the material (14) exceeds the predetermined height when the probe (44) slide a sufficient distance so that the portion thereof closes the contacts (30).

19 Claims, 1 Drawing Sheet

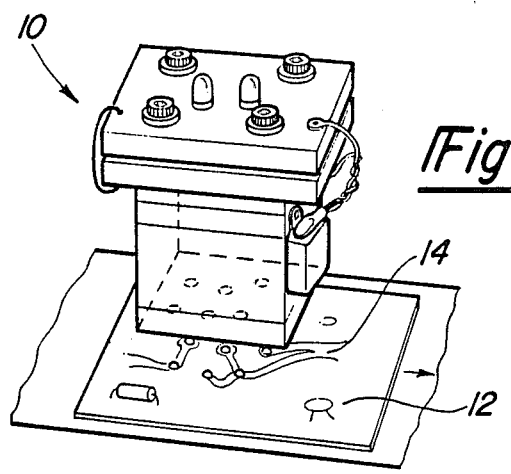
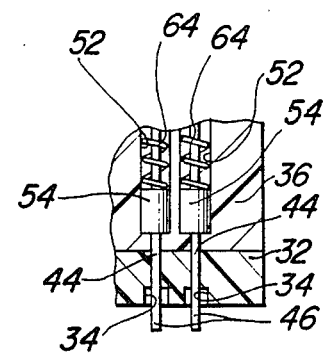
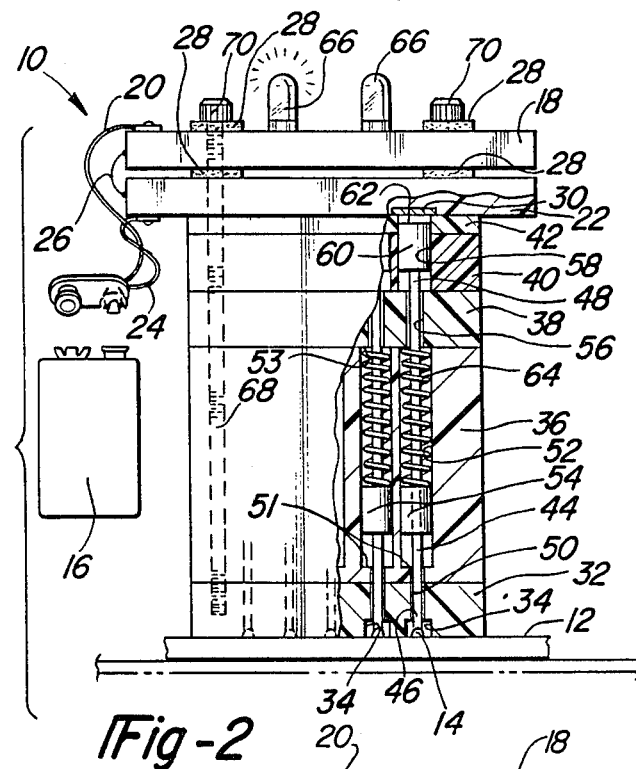
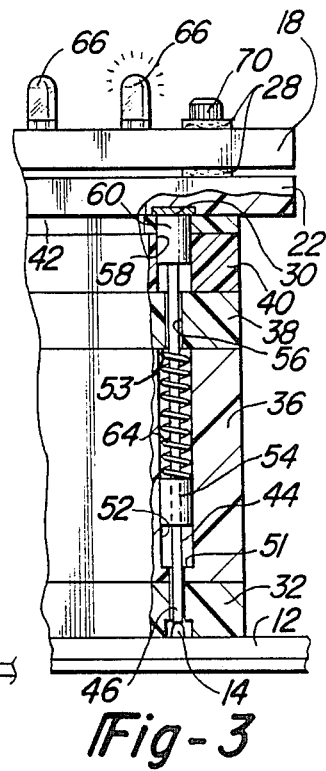
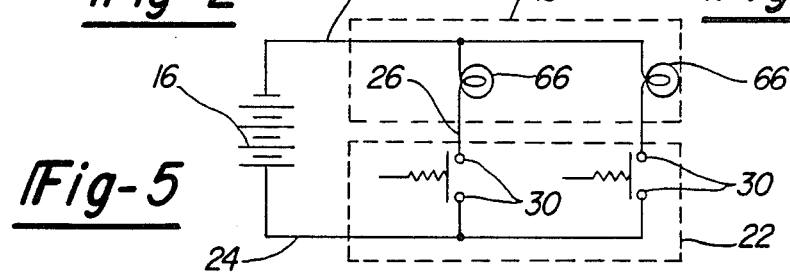

TOOL FOR MEASURING THE HEIGHT OF A MATERIAL BUILDUP ON A REFERENCE PLANE

BACKGROUND OF THE INVENTION

1. Field of the Invention

The subject invention relates to a device for mechanically measuring the difference in height between a reference plane and a material buildup.

2. Discussion

Currently, there are two well known devices for measuring the height difference between a reference plane and a material buildup on the reference plane such as solder bumps on a circuit board. The first device comprises a simple cantilever probe moveable on a fixed arm with a dial indicator to indicate a change in height. Both the tool and the circuit board are placed on a granite leveling slab. The circuit board is first leveled with that of the granite slab. The probe is lowered to contact the material buildup to indicate the height difference between the material buildup and the reference plane surface of the circuit board. The tool is then moved to change the probe's position on the circuit board. The probe indicate height differences by observing the changes in the dial readings.

A second device for measuring the height difference comprises a complex computer controlled machine, such as the Zeiss, which is programmed for a series of movement, probing and recording steps. In this device, the circuit board must also be leveled with the subsurface of the machine. An arm is lowered to contact the material buildup to provide an electronic readout as to the height difference between the material buildup and the reference plane surface of the circuit board.

One of the problems with the above devices is that the circuit board must be leveled with respect to the tool being used. This requires a large amount of time for proper set-up. Further, the second device requires programming which also takes a large amount of time. Further, both devices are very costly. Finally, neither of the above two devices are easily portable.

SUMMARY OF THE INVENTION

A tool is used for detecting whether material on a reference surface has exceeded a predetermined height. The tool includes a housing having a bottom surface with at least one opening therein for receiving the material whose height is to be tested. A probe means is slideably mounted within the housing and has one end located in the opening for contacting the material. A circuit means for each probe includes a pair of contacts spaced a given distance from a predetermined portion of the probe. An indicator means is coupled to each circuit means for signaling that the height of the material exceeds the predetermined height when the probe means slides a sufficient distance so that the portion thereof closes the contacts.

Accordingly, the subject invention allows quick inspection and determination of the required material buildup on a reference plane. The results of the insepction yield an immediate accept/reject decision for each given material buildup. Also, the subject invention is portable and does not require the reference plane to be leveled with the tool. Finally, the subject invention provides an instantaneous readout of the material buildup on the surface of the reference plane.

FIGURES IN THE DRAWINGS

Other advantages of the present invention will be readily appreciated as the same becomes better understood by reference to the following detailed description when considered in connection with the accompanying drawings wherein:

FIG. 1 is a perspective view of a measuring tool made in accordance with the teachings of the subject invention;

FIG. 2 is an elevational fragmentary view of the tool of FIG. 1;

FIG. 3 is a partial fragmentary elevational view of the tool of FIG. 1;

FIG. 4 is a partial enlarged view of the tool of FIG. 2; and

FIG. 5 is circuit schematic used in the tool of the subject invention.

DESCRIPTION OF THE PREFERRED EMBODIMENT

A tool for measuring and indicating the difference in height between a reference plane and material buildup on the reference plane is generally shown at 10 in FIGS. 1 and 2. The tool 10 is portable or hand-held and is preferably used to measure and indicate the difference in height between a reference plane 12, such as the surface of a circuit board, and a material buildup 14, such as solder buildup on the circuit board. The tool 10 includes a power supply 16 such as a battery or the like to supply electrical current. A circuit includes a first contact plate 18 is electrically connected to the power source 16 by a wire connector 20 to receive current from the power source 16. The circuit further includes a second contact plate 22 is electrically connected to the power source 16 by a wire connector 24 and to each individual circuit of the first contact plate 18 by a jumper wire 26 therebetween to receive current from the power source 16. The first contact plate 18 and second contact plate 22 are electrically conductive to transfer current between each other the power source 16. An insulating washer 28 is disposed between the first 18 and second 22 contact plates to prevent the first 18 and second 22 contact plates from contacting each other. The insulating washers 28 also prevent current from flowing from the first contact plate 18 and second contact plate 22 to each other through the washer 28. Hence, current flows between the first contact plate 18 and second contact plate 22 solely through the jumper wire 26. The second contact plate 22 includes a pair of contacts 30 or two printed wiring board (PWB) circuit pads to form a closed loop circuit for current flow between the power soruce 16 and the first contact plate 18 and second contact plate 22 when the contacts 30 are closed, as illustrated by the circuit schematic in FIG. 5.

The tool 10 also includes a housing or reference plane plate 32 having a bottom surface to contact and move along the reference plane 12. The reference plane plate 32 includes at least one, preferably a plurality of, openings or apertures 34 communicating therethrough to allow the material buildup 14 on the reference plane 12 to pass through the reference plane plate 32 as the reference plane plate 32 coontacts the reference plane 12. A series of plates 36, 38, 40 interconnect the second contact plate 22 and the reference plane plate 32. A main plate 36 is serially connected adjacent to the reference plane plate 32. An upper plate 38 is serially connected adjacent the main plate 36. An upper contact plate 40 is serially connected adjacent the upper plate 38. The main plate 36, upper plate 38 and upper contact plate 40 provide vertical height for convenient handling of the tool 10 and also provide ease in manufacturing the tool 10 as will hereinafter be described.

The tool 10 further includes an insulating plate 42 disposed between the second contact plate 22 and the upper contact plate 40 to prevent the second contact plate 22 and upper contact plate 40 from contacting each other. The insulating plate 42 prevents current from flowing from the second contact plate 22 to the upper contact plate 40. The insulating plate 42 also has a predetermined height corresponding to the limit of material buildup to be inspected. Hence, the preset height to be inspected of the material buildup 14 is controlled by the thickness of the insulating plate 42.

The tool 10 also includes a probing pole or rod 44 slideably disposed within the series of plates 32, 36, 38, 40 and 42 and having a first end 46 to contact material buildup and a second opposite end 48 to contact the contacts 30. The rod 44 is disposed in a second aperture 50 communicating through the reference plane plate 32 perpendicularly to the first aperture 34. The second aperture 50 is slightly larger than the diameter of the rod 44 to allow the rod to be slideably disposed in the reference plane plate 32. Also, the main plate 36 includes a third aperture 52 communicating therethrough and having a diameter larger than the second aperture 50 and having a first shoulder 51 at one end thereof. The upper plate 38 acts as a second should 53 at the other end of the third aperture 52. The rod 44 includes a guide 54 comprising a first washer fixedly disposed about the rod to guide the rod 44 along the third aperture 52. The guide 54 is slideably disposed in the third aperture 52. The first 51 and second 53 shoulders limit the travel of the guide 54 within the third aperture 52. The first shoulder 51 also prevents the rod 44 from falling out or exiting the apparatus 10.

The upper plate 38 includes a fourth aperture 56 which is smaller in diameter than the third aperture 52 of the main plate 36 to allow the rod 44 to be slideably disposed in the upper plate 38. The upper plate 38 limits the travel of the guide member 54 toward the second contact plate 22. The upper contact plate 40 also includes a fifth aperture 58 of a diameter larger than the fourth aperture 56 of the upper plate 38. The second end 48 of the rod 44 includes a second washer 60 fixedly disposed about the second end 48 of the rod 44 and slideably movable in the fifth aperture 58 to close the contacts 30. In other words, the second washer 60 acts as a switch to close the contacts 30 when the material buildup has reached the predetermined height. The height of the second washer 60 is such that when the first end 46 of the rod 44 is contacting the reference plane 12, the top surface 62 of the second washer 60 is flush with the bottom surface of the insulating plate 42. When the first end 46 of the rod 44 is at the predetermined height which is equal to the height of the insulating plate 42, the surface 62 of the second washer 60 will touch or contact the contacts 30 to act as a switch and close the contacts 30 to allow current to flow. Thus, the height to be measured is pre-set and adjustable by merely changing the height or thickness of the insulating plate 42. A spring 64 is disposed between the guide washer 54 and the bottom surface of the upper plate 38 to bias the first end 46 of the rod 44 against the material buildup 14 on the reference plate 12.

The tool 10 also includes an LED 66 which is connected to each set of contacts 30. When each set of contacts 30 are closed, the corresponding LED 66 will light or illuminate to indicate that the material buildup 14 is at least the predetermined height to be measured at the corresponding probe end. When several probing poles or rods 44 are used, some of the LEDs may not illuminate if the corresponding material buildup 14 is not at least the predetermined height at that probe end, as illustrated in FIGS. 2 and 3.

The tool 10 further includes a plurality of fasteners 68 having one end threadably connecting and securing the contact plates 18, 22 and the plates 32, 36, 38, 40, 42 together in a series as an integral unit. An insulating washer 28 and nut 70 are placed on the other end of the fastener 68.

In operation, the tool 10 is hand-held and moved along the reference plane 12 in the direction indicated by the arrow in FIG. 1. The first end 46 of the rod 44 contacts the material buildup 14 as it passes through the reference plane plate 32 which contacts the reference plane 12. If each material buildup 14 is at least the predetermined height to be measured, the second washer 60 on the second end 48 of the corresponding rod 44 will be moved upward to close the contacts 30 and illuminate the LED 66 to alert the operator that at that point on the material buildup 14, the material buildup 14 is at least the predetermined height required. The invention, without the aid of a microscope, will usually indicate height in thousandths of an inch resolution.

The invention has been described in an illustrative manner and it is to be understood that the terminology which has been used is intended to be in the nature of words of description rather than a limitation.

Obviously, many modifications and variations of the present invention are possible in light of the above teaching. It is, therefore, to be understood that the invention may be practiced otherwise than as specifically described.

What is claimed is:

1. A tool for detecting whether material on a reference surface has exceeded a predetermined height, said tool comprising:

a housing having a bottom surface with at least one opening therein for receiving the material whose height is to be tested;

probe means slideably mounted within the housing and having one end located in the opening for contacting the material;

circuit means having a pair of contacts spaced a given distance from a predetermined portion to the probe;

indicator means coupled to the circuit means for signalling that the height of the material exceeds the predetermined height when the probe slides a sufficient distance so that said portion thereof closes the contacts;

a first insulating means disposed between said circuit means and said housing for preventing current from flowing from said circuit means to said housing;

said first insulating means comprising an insulating plate disposed between said circuit means and said housing to prevent said circuit means and said housing from contacting each other and to prevent current from flowing from said circuit means to said housing; and said insulating plate having a predetermined height corresponding to a limit of material buildup to be inspected.

2. An apparatus as set forth in claim 1 characterized by said circuit means comprising a first contact plate electrically connected to said power supply means to receive current from said power supply means, and a second contact plate electrically connected to said power supply means and said first contact plate to receive current from either one of said power supply means and said first contact plate.

3. An apparatus as set forth in claim 2 including a second insulating means interconnecting said first and second contact plates for preventing said first and second contact plates from contacting each other and for preventing current from flowing from said first contact plate and said second contact plate to each other through said second insulating means.

4. An apparatus as set forth in claim 3 including connection means electrically connecting said first and second contact plates to each other for allowing current to flow from said first contact plate and said second contact plate to each other.

5. A tool for detecting whether material on a reference surface has exceeded a predetermined height, said tool comprising:
   a housing having a bottom surface with at least one opening therein for receiving the material whose height is to be tested;
   probe means slideably mounted within the housing and having one end located in the opening for contacting the material;
   circuit means having a pair of contacts spaced a given distance from a predetermined portion to the probe;
   indicator means coupled to the circuit means for signallying that the height of the material exceeds the predetermined height when the probe slides a sufficient distance so that said portion thereof closes the contacts;
   a first insulating means disposed between said circuit means and said housing for preventing current from flowing from said circuit means to said housing;
   said circuit means comprising a first contact plate electrically connected to said power supply means to receive current from said power supply means, and a second contact plate electrically connected to said power supply means and said first contact plate to receive current from either one of said power supply means and said first contact plate;
   a second insulating means interconnecting said first and second contact plates for preventing said first and second contact plates from contacting each other and for preventing current from flowing from said first contact plate and said second contact plate to each other through said second insulating means;
   connection means electrically connecting said first and second contact plates to each other for allowing current to flow from said first contact plate and said second contact plate to each other;
   said first insulating means comprising an insulating plate disposed between said circuit means and said housing to prevent said circuit means and said housing from contacting each other and to prevent current from flowing from said circuit means to said housing; and
   said insulating plate having a predetermined height corresponding to a limit of material buildup to be inspected.

6. An apparatus as set forth in claim 5 further characterized by said housing including a reference plane plate to contact and moveable along the reference plane, said reference plane plate including at least one aperture communicating transversely therethrough to allow the material buildup on the reference plane to pass through said reference plane plate.

7. An apparatus as set forth in claim 6 further characterized by said housing including a plurality of plates interconnecting said reference plane plate and said insulating plate.

8. An apparatus as set forth in claim 7 including fastener means for connecting and securing said contact plates and said plurality of plates together in series as a integral unit.

9. An apparatus as set forth in claim 6 further characterized by said reference plane plate including a second aperture communicating therethrough substantially perpendicular to and with said first aperture.

10. An apparatus as set forth in claim 9 including biasing means for biasing said probe means against the surface of the material buildup.

11. An apparatus as set forth in claim 10 further characterized by said probe means comprising a rod slideably disposed in said second aperture and having a first end to contact the material buildup and a second opposite end to contact said pair of contacts.

12. An apparatus as set for in claim 11 further characterized by said probe means including guide means disposed about said rod for guiding said rod along said second aperture.

13. An apparatus as set forth in claim 12 including a washer means disposed about said second end of said rod and having a first position spaced from said pair of contacts when the material buildup is below said predetermined height and a second position for closing said pair of contacts when said material buildup has reached said predetermined height.

14. An apparatus as set forth in claim 13 characterized by said reference plane plate including a first shoulder and a second shoulder spaced therefrom within said second aperture to limit the distance said guide means moves along said second aperture.

15. An apparatus as set forth in claim 14 further characterized by said biasing means comprising a spring disposed between said first shoulder and said guide means.

16. An apparatus as set forth in claim 14 further characterized by said washer means comprising a washer disposed about said second end of said rod.

17. An apparatus as set forth in claim 16 further characterized by said guide means comprising a washer disposed about said rod.

18. An apparatus as set forth in claim 17 further characterized by said first insulating means comprising a washer.

19. A portable apparatus for measuring and indicating the difference in height between a reference plane and a material buildup on the reference plane, said apparatus comprising:
   a power source;
   a first contact plate electrically connected to said power source to receive current from said power source;

a second contact plate electrically connected to said power source and said first contact plate for receiving current from either of said power source and said first contact plate;

at least one insulating washer interconnecting said first and second contact plates to prevent said first and second contact plates from contacting each other and to prevent current from flowing from said first contact plate and said second contact plate to each other through said insulating washer;

at least one connector connected to said first and second contact plates to allow current to flow from said first contact plate and said second contact plate to each other;

said second contact plate including a pair of contacts to form a closed loop circuit for allowing current flow between said power source and said first contact plate and said second contact plate when said contacts are closed;

a support plates means connected to said second contact plate for removably contacting and moving along the reference plane and for allowing the material buildup on the reference plate to pass through said support plate means;

an insulating plate disposed between said second contact plate and said support plate means for preventing said second contact plate and said support plate means from contacting each other and for preventing current flow from said second contact plate to said support plate means, said insulating plate having a predetermined height corresponding to a limit of material buildup to be inspected;

indicating means connected to said first contact plate for indicating when the material buildup has reached said predetermined height;

probe means slideably disposed in said support plate means and said insulating plate for contacting and moving solely along the surface of the material buildup and for closing said contacts when the material buildup has reached said predetermined height to indicate that the material buildup is at least said predetermined height;

fastener means for connecting and securing said contact plates and said plate means together in series as an integral unit;

said support plate means comprising a reference plane plate to contact and move along the reference plane, said reference plane plate including at least one aperture communicating transversely therethrough to allow the material buildup on the reference plane to pass through said reference plane plate, and a series of plates interconnecting said reference plane plate and said insulating plate;

said probe means comprising a rod and including a biasing means for biasing said rod against the surface of the material buildup, guide means for guiding said rod along a bore in said series of plates, and washer means for closing said contacts.

* * * * *